Figure 1A:
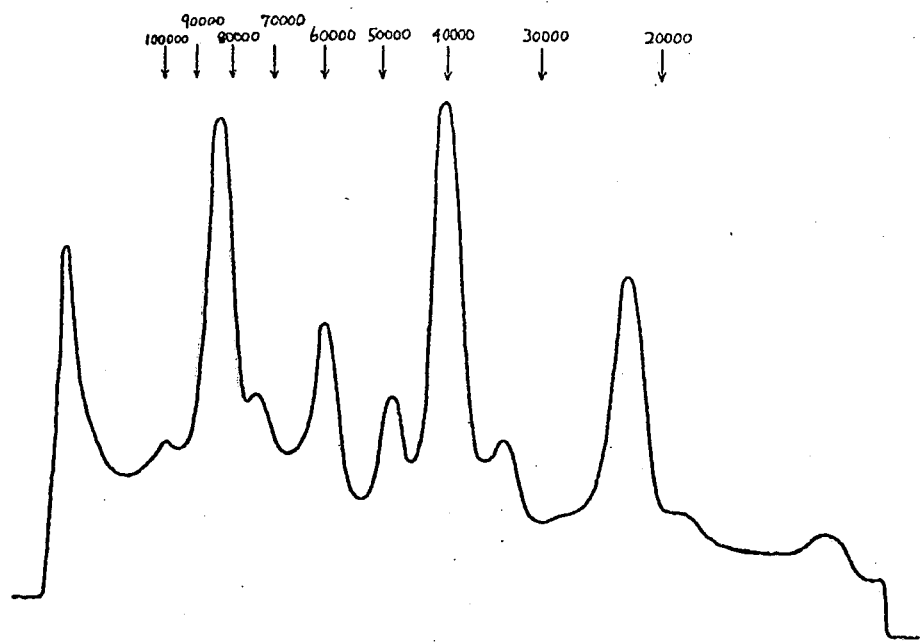

United States Patent [19]

Fujimaki et al.

[11] 4,145,455
[45] Mar. 20, 1979

[54] MODIFIED PROTEIN COMPOSITIONS AND PREPARATION THEREOF

[75] Inventors: Masao Fujimaki, Tokyo; Soichi Arai, Yokohama; Michiko Watanabe, Matsudo; Yukio Hashimoto, Izumiotsu; Akira Kurooka, Osaka, all of Japan

[73] Assignee: Fuji Oil Company, Limited, Osaka, Japan

[21] Appl. No.: 673,885

[22] Filed: Apr. 5, 1976

[30] Foreign Application Priority Data

Apr. 4, 1975 [JP] Japan .................................. 50-41599

[51] Int. Cl.² ............................ A23J 3/00; A23J 3/02
[52] U.S. Cl. ..................................... 426/614; 426/656; 426/657; 426/564; 426/573; 426/568; 96/114.7
[58] Field of Search ............... 426/656, 657, 564, 573, 426/614, 568; 260/112 R, 119, 121, 123.5; 96/114.7

[56] References Cited

U.S. PATENT DOCUMENTS

| 3,803,327 | 4/1974 | Fujimaki et al. | 426/32 |
| 3,966,985 | 6/1976 | Jonas | 426/533 |

OTHER PUBLICATIONS

*J. Agr. Food Chem.*, 19(6), (1971), pp. 1151-1154.
*Agr. Biol. Chem.*, 34(10), (1970), pp. 1593-1596.
*Agr. Biol. Chem.*, 38(3), (1974), pp. 679-680.
*Agr. Biol. Chem.*, 38(6), (1974), pp. 1269-1271.

*Primary Examiner*—Joseph M. Golian
*Attorney, Agent, or Firm*—Wenderoth, Lind & Ponack

[57] ABSTRACT

A modified protein composition which is produced by contacting a water-soluble protein, such as plant seed proteins, cow milk protein, animal meat proteins, fish meat proteins, egg proteins and microorganisms proteins, with a cysteine-enriched plastein in an amount of at least 1% by weight on the basis of the water-soluble protein in an aqueous medium, and if desired, heating the resultant under a mild condition (e.g. at a temperature of 40° to 90° C.), said cysteine-enriched plastein being produced by hydrolyzing a protein with an enzyme having an endopeptidase activity and subjecting the hydrolyzate to dehydration-condensation with a protease having an esterase activity in the presence of an activated cysteine (e.g. lower alkyl cysteinate, N-acetyl-L-cysteine or L-cysteinyl-L-cysteine).

7 Claims, 6 Drawing Figures

MODIFIED PROTEIN COMPOSITIONS AND PREPARATION THEREOF

The present invention relates to a modified protein composition and a method for the preparation thereof. More particularly, it relates to a novel protein composition modified with a cystein-enriched plastein and a method for the preparation thereof.

The so-called "plastein" is a protein-like high molecular substance which is produced by hydrolyzing proteins with an enzyme and then reconstituting the resultant. The plastein is considered to be a complex mixture of high molecular polypeptides having a molecular weight of about 4,000 to about 20,000 and protein-like low molecular substances, but the arrangement of the amino acids and the distribution of the molecular weight are not yet sufficiently made clear.

Recently, in the fields of nutrients and medicines, there has been an increasing interest in the plastein, because protein-like substance having an interesting nutritious or immunological effect may be produced by incorporating various amino acids into the pastein when it is reconstituted, or by eliminating a certain amino acid from the plastein. This fact has been proved by the synthesis of the plastein enriched with methionine, lysine, glutamic acid, or the like, for instance, methionine-incorporated plastein: Yamashita et al, J. Agr. Food Chem., Vol. 19, No. 6, pages 1151–1154 (1971) and Agr. Biol. Chem., Vol. 36, No. 8, pages 1353–1360 (1972); glutamic acid-incorporated plastein: Yamashita et al, Agr. Biol. Chem., Vol. 38, No. 6, pages 1269–1271 (1974); and tryptophan-, threonine- and lysine-enriched plasteins: Aso et al, Agr. Biol. Chem., Vol. 38, No. 3, pages 679–680 (1974).

Besides, the present inventors have accomplished the synthesis of a low-phenylalanine plastein (U.S. Ser. No. 649,794 filed on Jan. 16, 1976). Among the genetic, abnormal metabolic diseases, phenyl ketonuria is the representative one. Newly born babies suffering from the disease are congenitally lacking in an enzyme, phenylalanine-hydroxydase, which converts phenylalanine to tyrosine. The disease is characterized in the excretion of the abnormal matabolic products, phenylketones, and most of the children suffering from this disease inevitably become imbecile or the like, with an I.Q. index below 50. The existing reliable therapeutic or preservative means against this disease are merely a diet therapy wherein a certain low-phenylalanine diet is given. Accordingly, the development of the low-phenylalanine plastein is good news to these children and parents thereof.

Thus, the plasteins are a very interesting substance from the standpoints of the nutrition and the therapy of disease, but other utilities thereof have never been found or developed.

During the present inventors' studies on the chemical properties and the functions of the plasteins, the cysteine-enriched plastein (hereinafter, referred to as "CySH-P") was sought. Cysterine is only one compound having sulfhydryl (—SH) group among the natural amino acids, and this —SH group is easily converted into disulfide (—S—S—) group and thereby forms a network structure together with another sulfhydryl group. Accordingly, it is assumed that the desired composition enriched with the high reactive sulfhydryl group may be obtained by incorporating cysteine into plastein.

On the basis of this assumption, the present inventors have synthesized various CySH-P's by reacting an enzymatically hydrolyzed product of various proteins with a cysteine ester (e.g. ethyl cysteinate) and have mixed the CySH-P thus obtained with a water-soluble protein, such as albumin and globulin. As the result, it has been found that the products show very interesting properties. For instance, when a small amount of the CySH-P produced from soybean protein is admixed with soybean protein or egg-white, the mixture shows an increased foamability with the lapse of time while the CySH-P per se has no such foamability. Besides, when the CySH-P produced from soybean protein is heated together with soybean protein in an aqueous medium, the mixture shows an extremely increased viscosity while the CySH-P per se has no coagulation property by heating. Since the principle of the foaming or the gelation with proteins has not been theoretically made clear, these newly found phenomena are not presumed. Taking into consideration the fact that the CySH-P is an entirely harmless protein-like substance, in addition to these newly found properties thereof, it will be useful in the field of foodstuffs.

An object of the present invention is to provide an improved protein composition having excellent properties, such as excellent gelling properties and foamability.

Another object of the invention is to provide a protein composition modified with a cysteine-enriched plastein (CySH-P).

A further object of the invention is to provide a method for producing the improved protein composition by modifying the protein with CySH-P.

A still further object of the invention is to provide a novel CySH-P useful as a modifier of the protein.

These and other objects of the invention will be apparent from the following description.

According to the present invention, the desired protein composition having excellent properties, such as excellent gelling properties and foamability, can be produced by contacting CySH-P with a water-soluble protein, such as alubumin and globulin, in an aqueous medium, and if desired, heating the resulting mixture under a mild condition.

The CySH-P used as a modifier in the present invention is a novel composition and may be produced by a conventional method for producing plasteins. That is, it is produced by hydrolyzing a protein with an enzyme having an endopeptidase activity to give a hydrolyzate comprising predominantly peptides and reacting the hydrolyzate with a protease having an esterase activity in the presence of an activated cysteine, such as a lower alkyl cysteinate (e.g. ethyl cysteinate), N-acetyl-L-cysteine, or L-cysteinyl-L-cysteine.

This process can be illustrated by the following scheme:

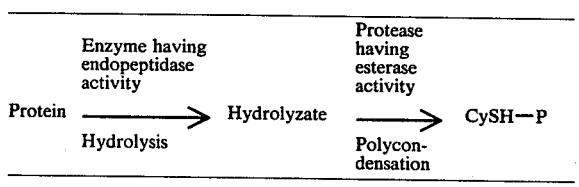

In the above process, the starting protein may be any water-soluble or water-dispersible proteins, but the hardly hydrolyzable protein is not suitable because the yield of the CySH-P depends on the hydrolyzability of the proteins. Moreover, even if the protein is easily hydrolyzable, when it has no sulfhydryl group in the molecule, such as gelatin, it is not preferable because the plastein thus obtained has a low cysteine content. Suitable examples of the proteins are animal or vegetable albumin or globulin, such as egg white, cow milk protein, animal meat protein, fish meat protein, plant seed proteins (e.g. soybean protein, white gluten, peanut protein), microorganism proteins, or the like. Gliadin protein such as gluten may be hydrolyzed by a protease having the optimum pH value at an alkaline range, such as Pronase (made by Kaken Chemical Co., Ltd.), but if the protein is hydrolyzed in an alkaline range, the substrate shows an unfavorably decreased resistance against putrefaction and therefore the operation must be performed under a sterilized condition. Accordingly, such proteins hydrolyzable at an alkaline range are not necessarily preferable from the standpoint of the workability.

The enzyme used for the hydrolysis of proteins is preferably the one having an endopeptidase activity, because the enzyme can hydrolyze the proteins to give peptides having similar size of molecule (the molecular weight: about 1,000) which are suitable for the plastein-producing reaction. Suitable examples of the enzymes are animal or plant enzymes, such as pepsin, papain or chymotrypsin, or microorganism enzymes, such as Bioprase (made by Nagase Sangyo K.K.).

The CySH-P preferably has a content of half-ciptine of about 5% by weight or more.

The hydrolyzate thus obtained is subsequently subjected to the plastein-producing reaction. The hydrolyzate has preferably 80 to 85% of nitrogen soluble in 10% trichloroacetic acid per total nitrogen of the hydrolyzate. Accordingly, the hydrolysate may be purified by various physico-chemical means, such as the removement of large polypeptides with trichloroacetic acid, or the gel filtration.

The enzymes used for the plastein-producing reaction are preferably those having an esterase activity. Suitable examples of the enzymes are pepsin, Molsin (made by Seishin Seiyaku K.K.), Rapidase (made by Takeda Chemical Industries, Ltd.), α-chymotrypsin, Bioprase (made by Nagase Sangyo K.K.), Nagase (made by Nagase Sangyo K.K.), Pronase (made by Kaken Chemical Co., Ltd.) Prozyme (Kyowa Hakko Kogyo K.K.), Thermoase (Daiwa Kasei K.K.), papain, or the like. The concentration of the substrate should be 20 to 50% by weight. Since the optimum pH range of the enzyme used in the plastein-producing reaction is comparatively small, the incubation should be carried out with carefully adjusting the pH value within the suitable range. To the cultivation broth thus obtained are added trichloroacetic acid and ethanol, in which the plastein is insoluble, and the insoluble materials are collected to give the crude plastein. In the above reaction, when a small amount of an activated cysteine (e.g. ethyl cysteinate) is added to the reaction system, the added cysteine is taken in the peptide chain during the reconstitution of the peptide chain and a part of the —SH group included in the cysteine taken in the peptide chain is converted into —S—S— group, and thereby the network structure is formed and a large molecular peptide is produced. According to the analysis of the reaction product with sodium dodecyl sulfate (SDS) disc electrophoretic method, such a big molecular peptide is not observed and the peptides may have an average molecular weight of about 8,000.

The CySH-P thus obtained is contacted with various proteins in an aqueous medium, by which the properties of the proteins are modified. If desired, after contacting the CySH-P and the proteins, the mixture may be heated under a mild condition, for instance, at 40° to 90° C., and further, if desired, it may be agitated. The proteins may be plant seed proteins (e.g. soybean protein or gluten), cow milk protein, animal meat proteins, fish meat proteins, egg proteins, microorganisms proteins, or the like. Screloproteins such as keratin are not suitable because they are hardly soluble in water. Besides, gelatin is not suitable either, because it does not contain —SH group and does not show the desired properties even after it is modified with CySH-P. In the above procedure, a small amount of an oxidizing agent, such as potassium bromide or hydrogen peroxide, is preferably added to promote the formation of —S—S— bond.

The CySH-P obtained from soybean protein has, for instance, the following components.

| | | |
|---|---|---|
| Lysine | 6.29 | % by weight |
| Aspartic acid | 11.76 | % by weight |
| Glycine | 2.89 | % by weight |
| Leucine | 4.65 | % by weight |
| Histidine | 1.92 | % by weight |
| Threonine | 2.85 | % by weight |
| Alanine | 3.02 | % by weight |
| Tyrosine | 2.37 | % by weight |
| Serine | 4.15 | % by weight |
| Valine | 3.49 | % by weight |
| Phenylalanine | 3.49 | % by weight |
| Arginine | 6.24 | % by weight |
| Glutamic acid | 17.91 | % by weight |
| Methionine | 1.05 | % by weight |
| ½ Cystine | 8.65 | % by weight |
| Proline | 3.70 | % by weight |
| Isoleucine | 3.66 | % by weight |
| Ammonia | 2.19 | % by weight |
| Total | 90.50 | % by weight |

The modifications of the properties of the proteins by the present invention are shown below.

(1) Viscosity:

A CySH-P produced from soybean protein is added to a 8% isolated soybean protein solution, a 10% sodium caseinate solution and a 5% gelatin solution in an amount of 5% by weight on the basis of the weight of each protein (calculated as the solid material), and the temperature of each mixture is raised from 40° C. to the mixture temperature of 90° C. and then returned to 40° C., during which the viscosity of the mixture at each temperature is measured with a type B viscometer (at 30 seconds after agitating at 60 r.p.m. with No. 1 rotor). The results are shown in Table 1.

Table 1

| Protein to be treated[1] | Viscosity (cp) Temperature (°C.)[2] | | | | | | | | | | | | Note |
|---|---|---|---|---|---|---|---|---|---|---|---|---|---|
| | 40 | 50 | 60 | 70 | 80 | 90 | 90 | 80 | 70 | 60 | 50 | 40 | |
| | 8.8 | 7.7 | 7.2 | 7.1 | 6.0 | 5.8 | 6.0 | 6.6 | 7.8 | 8.8 | 10.8 | 14.0 | pH 10[*3] |
| | 9.8 | 7.8 | 7.3 | 5.9 | 5.3 | 5.2 | 5.5 | 6.3 | 6.7 | 8.1 | 9.2 | 10.8 | pH 10[*4] |
| | 6.7 | 5.9 | 5.2 | 4.5 | 4.4 | 4.4 | 5.2 | 5.5 | 5.9 | 6.6 | 7.4 | 8.5 | pH 10 |
| Soybean protein | 12.8 | 8.6 | 7.7 | 6.8 | 6.6 | 5.8 | 6.7 | 7.8 | 8.8 | 10.5 | 13.7 | 17.3 | pH 6.95[*3] |
| | 8.6 | 5.7 | 4.8 | 5 | — | 48.1 | 27.2 | 23.1 | 23.7 | 27.2 | 32.0 | 40.7 | pH 6.95 |

Table 1-continued

| Protein to be treated[*1] | Viscosity (cp) Temperature (°C.)[*2] | | | | | | | | | | | | Note |
|---|---|---|---|---|---|---|---|---|---|---|---|---|---|
| | 40 | 50 | 60 | 70 | 80 | 90 | 90 | 80 | 70 | 60 | 50 | 40 | |
| | 26.1 | 5.1 | 5.2 | 4.7 | 4.7 | 4.9 | 5.2 | 6.0 | 5.9 | 7.2 | 8.0 | 9.0 | pH 6.95[*4] |
| Casein | 21.6 | 15.1 | 10.7 | 8.4 | 7.4 | 6.0 | 6.3 | 8.1 | 9.9 | 13.5 | 20.7 | 33.0 | pH 6.97[*3] |
| | 15.8 | 9.6 | 7.4 | 5.4 | 4.5 | 3.9 | 3.4 | 3.7 | 4.4 | 5.2 | 5.9 | 7.0 | pH 6.96 |
| Gelatin | 20.4 | 17.0 | 14.3 | 9.2 | 6.6 | 5.0 | 4.2 | 4.0 | 5.3 | 5.5 | 6.2 | 7.0 | pH 6.93[*3] |
| | 5.7 | 4.5 | 4.0 | 3.3 | 2.9 | 3.1 | 2.8 | 3.2 | 3.3 | 3.5 | 3.5 | 4.0 | pH 6.95 |

Remarks:

[*1] Each test sample is agitated with a homomixer for 10 minutes and the pH value thereof is adjusted, and then the mixture is defoamed by centrifuging at 1,000 r.p.m. for one minute, and thereafter the viscosity is measured.

[*2] The temperature of the mixture is raised at the rate of 1° C./min. and when it reaches a 90° C., it is kept at that temperature and thereafter cooled to 40° C., likewise.

[*3] No CySH-P is added (reference).

[*4] 0.25% by weight of cystein on the basis of soybean protein is added (reference).

As is made clear from the above test results, it tends to decrease the viscosity of the protein to be treated by the addition of CySH-P excepting the case of soybean protein (pH 6.95), and in case of gelatin, it is particularly remarkable. In case of soybean protein (pH 6.95), viscosity thereof is, on the contrary, remarkably increased by the addition of CySH-P. These phenomena will indirectly prove the fact that the multiple structure of the protein to be treated is changed by the addition of CySH-P.

Figure 1B:
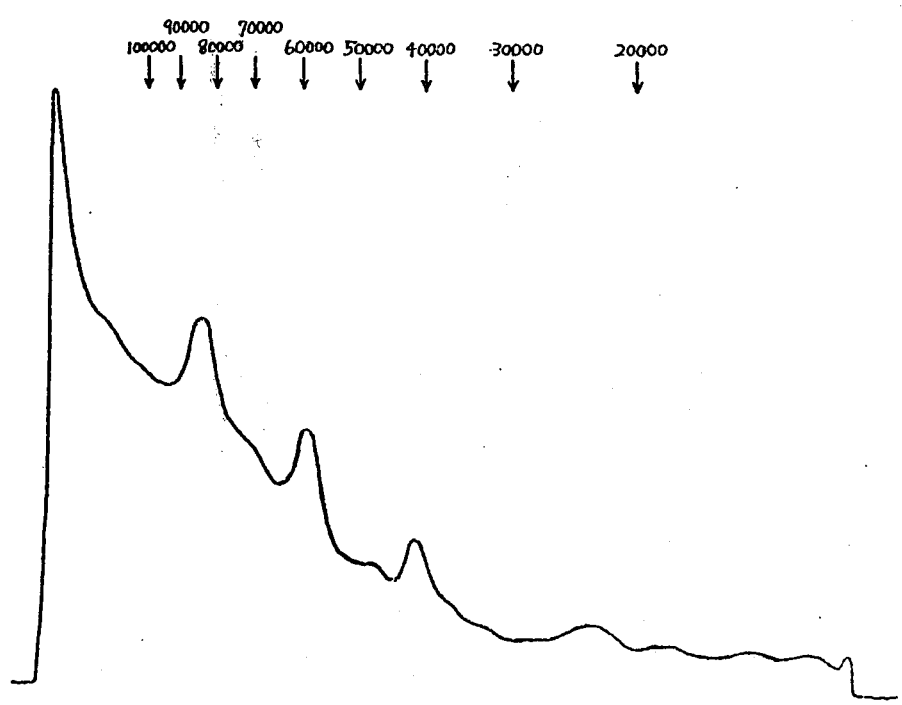
Figure 1C:
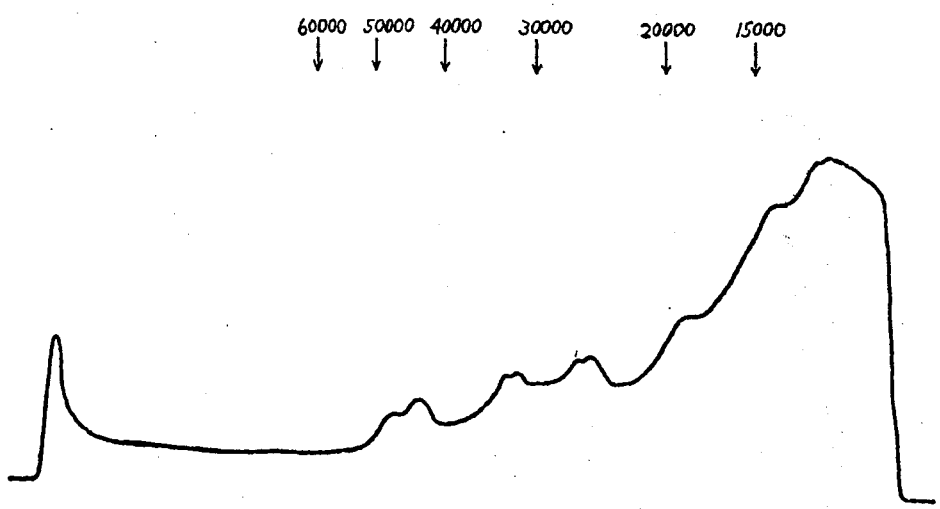
Figure 1D:
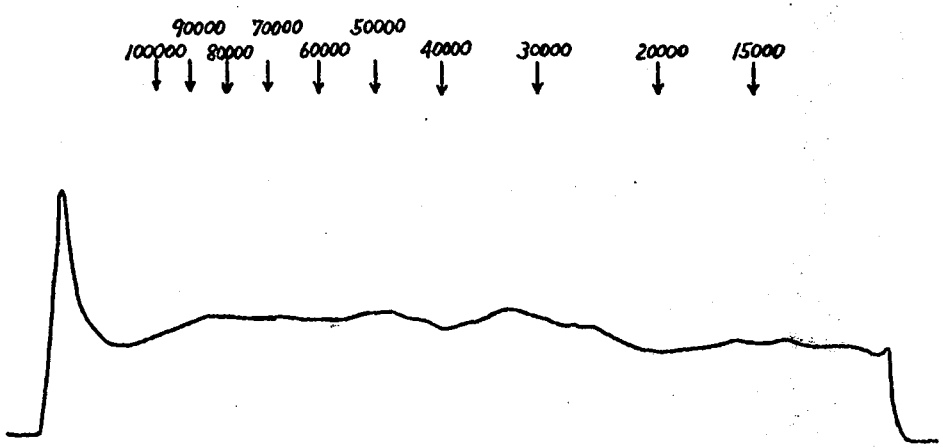

The test samples incorporated with or without mercaptoethanol (i.e. ethylene thioglycol), wherein sodium dodecyl sulfate is used as a dispersing agent, are analyzed by an SDS disc electrophoretic method with polyacrylamide gel (10%). The densitographs of the test results are shown in the accompanying FIGS. 1A, 1B, 1C and 1D, wherein the numerals represent molecular weight. As shown in FIG. 1B, in case of soybean protein, it is merely polymerized by means of —S—S— crosslinkage by heating, but no degradation of the subunit thereof is observed. This fact is made more clear from the densitograph on the sample obtained by cleaving the —S—S— bond with a reducing agent (e.g. mercaptoethanol) as shown in FIG. 1A. On the other hand, in case of the sample obtained by adding CySH-P to soybean protein and heating the mixture as shown in FIG. 1D, the subunit of the soybean protein is completely degraded and it is converted into an entirely different protein-like substance. From the densitograph on the sample obtained by cleaving the —S—S— bond with a reducing agent as shown in FIG. 1C, it is made clear that the protein-like substance as mentioned above comprises low molecular protein-like substances having a molecular weight of about 10,000 which are not contained in the starting soybean protein.

Figure 2A:
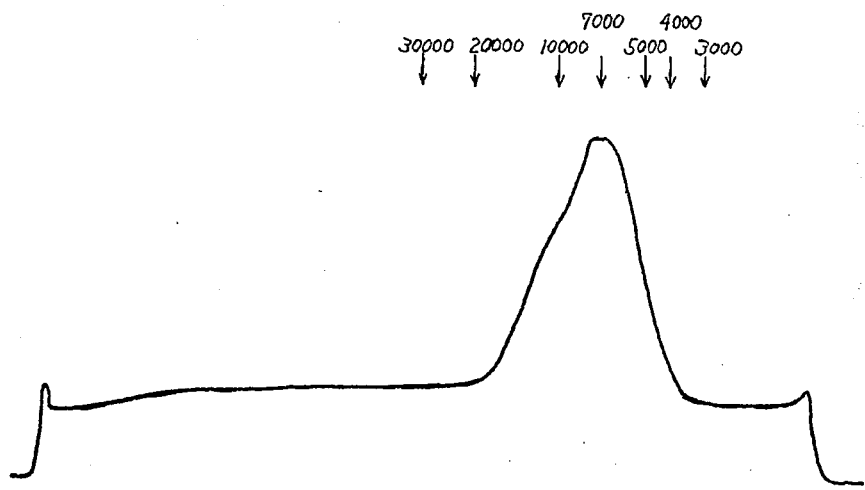
Figure 2B:
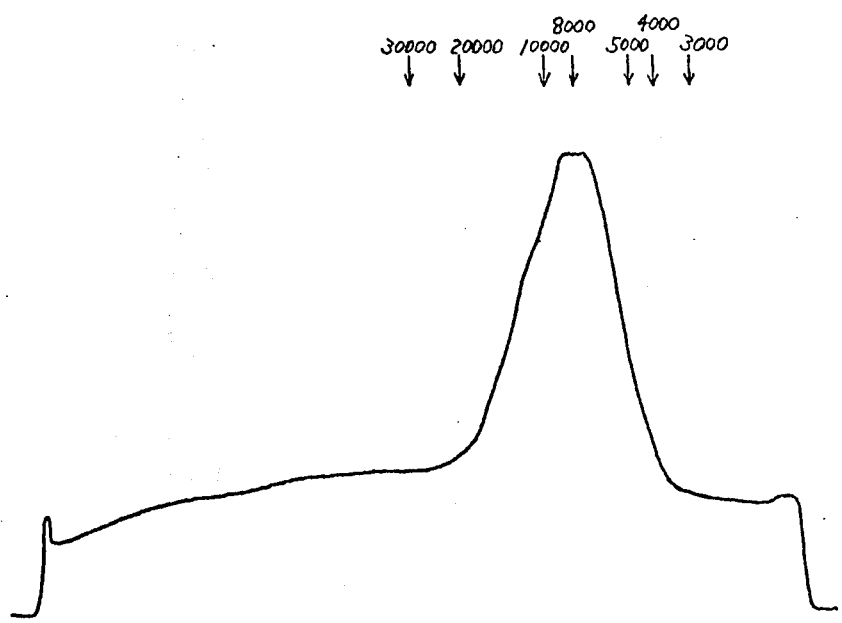

FIGS. 2A and 2B show the densitographs on CySH-P per se, which are measured by the same electrophoretic analysis with polyacrylamide gel (gel concentration: 20%) as in FIG. 1. When the reducing agent (mercaptoethanol) is not added as shown in FIG. 2B, the molecular weight of the product ranges from 4,000 to 20,000, and the average molecular weight thereof is assumed to be about 8,000. On the other hand, when the reducing agent is added as shown in FIG. 2A, it is observed that the average molecular weight of the product is decreased by about 1,000, which suggests that the cysteine added during the preparation of CySH-P is fairly oxidized and is present in the form of —S—S— bond.

Moreover, the possibility of any reaction between the CySH-P and the substrate protein may be proved by the change of the —SH group content in the substrate protein and the produced composition, for instance, by the following test. To an 8% aqueous solution of soybean protein is added CySH-P produced from soybean protein in an amount of 5% by weight, and the composition is heated gradually. After the temperature reaches a maximum, the composition is again cooled, during which the —SH group content is measured by Ellman's colorimetry. The results are shown in the following Table 2.

Table 2

| Temperature (°C.) | Optical density (O.D. 412 mμ) | —SH group content | |
|---|---|---|---|
| | | mol/1000 ml | mol/g/wetted powder |
| Not heated (room temperature) | 0.205 | $5.44 \times 10^{-5}$ | $1.62 \times 10^{-5}$ |
| 40 | 0.185 | $4.91 \times 10^{-5}$ | $1.34 \times 10^{-5}$ |
| 50 | 0.156 | $4.14 \times 10^{-5}$ | $1.23 \times 10^{-5}$ |
| 60 | 0.131 | $3.49 \times 10^{-5}$ | $1.03 \times 10^{-5}$ |
| 70 | 0.103 | $2.73 \times 10^{-5}$ | $0.81 \times 10^{-5}$ |
| 80 | 0.081 | $2.15 \times 10^{-5}$ | $0.64 \times 10^{-5}$ |
| 90 | 0.057 | $1.51 \times 10^{-5}$ | $0.45 \times 10^{-5}$ |
| 90 | 0.057 | $1.51 \times 10^{-5}$ | $0.45 \times 10^{-5}$ |
| 80 | 0.063 | $1.67 \times 10^{-5}$ | $0.50 \times 10^{-5}$ |
| 60 | 0.053 | $1.41 \times 10^{-5}$ | $0.42 \times 10^{-5}$ |
| 40 | 0.054 | $1.43 \times 10^{-5}$ | $0.43 \times 10^{-5}$ |

As is made clear from the above test results, the —SH group content is decreased with the heating but the decreased —SH group content is not recovered even if it is cooled. This fact suggests that the —SH group forms a —S—S— bond which is further changed into a —SO$_3$H group.

(2) Gelation properties:

A CySH-P produced from soybean protein or casein or a natural plastein produced from soybean protein is added to a solution of various substrate proteins, and each mixture thus obtained is adjusted to pH 6.95 and defoamed by centrifuging at 2,000 r.p.m. for 5 minutes. After heating at 80° C. for 30 minutes, the mixture is cooled and then kept in a refrigerator for one hour. Thereafter, the gel strength of the mixture is measured by a curd meter (curd knife: 12 φ, at 5° C.). The results are shown in the following Table 3.

Table 3

| Substrate protein Kind | Concentration (% by weight) | Plastein Kind | Concentration (% by weight) | Gel strength (g) | State of gel when measured | Note |
|---|---|---|---|---|---|---|
| Soybean protein | 10 | — | — | Too soft, impossible to measure | Slightly gelled; Dried bean curd-like film is formed at the surface | Reference |
| | 10 | CySH-P(S) | 0.5 | " | Gelation occurs, but it is very soft | |
| | 10 | " | 5 | 27 | Good gelation | |
| | 10 | " | 10 | 22 | Good gelation | |
| | 10 | " | 15 | 15 | Completely gelled, but cracking occurs | |
| | 10 | " | 20 | 9 | Similar gelation as in the above (CySH-P: 15%), but the cracking occurs more | |
| | 15 | — | — | 56 | The mixture is pudding-like and has a good elasticity | Reference |
| | 14.3 | CySH-P(S) | 0.7 | 112 | The mixture has a poor elasticity and is loose | |
| Gelatin | 8 | — | — | — | Not gelled | Reference |
| | 5 | — | — | 104 | Good gelation | Reference |
| | 5 | CySH-P(S) | 5 | 56 | CySH-P(S) is fairly precipitated after heating | |
| Egg white | — | CySH-P(S) | 5 | | Good gelation Inferior gelation | Reference |
| Soybean protein | 8 | natural plastein | 5 | | Inferior gelation | |
| | 8 | CySH-P(S) | 5 | | Gelation | |

Remark:
CySH-P(S) is a CySH-P produced from soybean protein.

From the above results, it is assumed that the CySH-P should be added to the soybean protein in an amount of about 5% by weight on the basis of soybean protein in order to form the desired gel. This assumption is confirmed by measuring the gel strength of various mixtures of soybean protein with a CySH-P produced from soybean protein and/or a natural plastein produced from soybean protein. The results are shown in the following Table 4.

Table 4

| Components[1] | | | Content of half-cystine in plastein (% by weight) | Gel strength (g) |
|---|---|---|---|---|
| Concentration of soybean protein (% by weight) | Concentration of CySH-P[2] (% by weight) | Concentration of natural plastein[3] (% by weight) | | |
| 10 | — | — | — | 12 |
| " | 0.5 | 4.5 | 2.67 | ca.12 |
| " | 1.25 | 3.75 | 3.66 | ca.12 |
| " | 2.5 | 2.5 | 5.33 | 20 |
| " | 5.0 | — | 8.65 | 50 |

Remarks:
[1] pH value of mixture is 7.0 ± 0.1.
[2] The concentration of the CySH-P and the natural plastein is based upon soybean protein.
[3] The content of half-cystine in the plastein is 8.65% by weight for the CySH-P and 2.00% by weight for the natural plastein, respectively.

From the above test results, it will be considered that the content of half-cystine necessary for promoting the gelation of soybean protein with CySH-P is about 5% by weight at minimum, and about 1.5% by weight of the half-cystine is contained in the CySH-P in the form of cysteine. However, it shows a poor effect on the substrate proteins having no —SH group, such as gelatin. On the other hand, in case of the substrate proteins having good gelation properties, such as egg white, the gelation properties thereof are decreased by admixing with the CySH-P.

The above-mentioned excellent properties of the CySH-P produced from soybean protein are also shown by the CySH-P produced from casein, and there is no difference in the kind of the substrates for producing plastein. The following Table 5 shows the gel strength of the reaction product of soybean protein with CySH-P, wherein the gel strength is measured in the same manner as described above in case of Table 3, excepting that a yogurt knife is used as the plunger instead of a curd knife (owing to this difference of the plunger, the data are somewhat different from those in Table 3).

Table 5

| Components | pH value | Gel strength (g) | Note |
|---|---|---|---|
| 10% solution of soybean protein | 7.0±1 | 10 | Reference |
| 10% solution of soybean protein + CySH-P produced from soybean protein (5% by weight on the basis of soybean protein) | 7.0±1 | 34 | |
| 10% solution of soybean protein + CySH-P produced from casein (5% by weight on the basis of soybean protein) | 7.0±1 | 66 | |

As is made clear from the above results, every CySH-P produced from various proteins show similarly synergistic effects on the gelation properties of the soybean protein, while they are more or less different in the gel-forming strength in terms of the kinds of the proteins used for the production of the CySH-P.

(3) Foamability

A CySH-P is added to various protein solutions in various ratios, and each mixture is mixed with a homomixer and defoamed by centrifuging at 1,000 r.p.m. for 2 minutes. The mixture is foamed by agitating at 172 r.p.m. with Kenwood chef mixer for a fixed time, and then the specific gravity of the product is measured. The results ae shown in the following Table 6.

Table 6

| Test sample | | Specific gravity Foaming time (minute) | | | | | | |
|---|---|---|---|---|---|---|---|---|
| pH value | Components | 3 | 6 | 9 | 12 | 15 | 20 | Note |
| 6.98 | Soybean protein (5% by weight) | 0.298 | 0.279 | 0.248 | 0.236 | 0.231 | 0.224 | Bad foamability, syneresis occurs |
| 6.98 | Soybean protein (5% by weight) + CySH-P produced from soybean protein (5% by weight on the basis of soybean protein) | 0.182 | 0.163 | 0.151 | 0.140 | 0.131 | 0.130 | Good foaming, syneresis occurs |
| 6.98 | Soybean protein (5% by weight) + CySH-P produced* from soybean protein (5% by weight on the basis of soybean protein) | 0.116 | 0.108 | 0.101 | 0.100 | 0.097 | 0.097 | Excellent foaming, syneresis occurs slightly |
| 6.98 | Soybean protein (5% by weight) + CySH-P produced from soybean protein (0.25% by weight on the basis of soybean protein) | 0.170 | 0.192 | 0.186 | 0.189 | 0.174 | 0.189 | Syneresis occurs remarkably |
| 6.98 | Soybean protein (5% by weight) + CySH-P produced* from soybean protein (0.25% by weight on the basis of soybean protein) | 0.091 | 0.133 | 0.130 | 0.124 | 0.134 | 0.147 | Synersis occurs remarkably |
| 6.97 | Casein (5% by weight) | 0.174 | 0.151 | 0.143 | 0.142 | 0.134 | 0.131 | Bad foam stability |
| 6.96 | Casein (5% by weight) + CySH-P produced from soybean protein (5% by weight on the basis of casein) | 0.144 | 0.138 | 0.136 | 0.133 | 0.131 | 0.128 | Bad foam stability |
| 8.28 | Egg white | 0.133 | 0.130 | 0.120 | 0.119 | 0.119 | 0.104 | Excellent foam stability |
| 8.24 | Egg white + CySH-P produced from soybean protein (5% by weight on the basis of egg white) | 0.129 | 0.114 | 0.105 | 0.095 | 0.092 | 0.082 | Excellent foam stability |

Remark:
*The test sample is modified by heating at 80° C for 30 minutes after defoamation thereof.

As is made clear from the above results, the CySH-P shows excellent promoting effect of the foamability of the substrate protein, particularly in case of a heat-modified soybean protein, the foamability of which is superior to that of egg white. Moreover, in case of the proteins having an excellent foamability by themselves, such as egg white, the foamability thereof is promoted further by incorporating the CySH-P therein.

Thus, the important object of the present invention is to provide improved proteins or protein-containing foodstuffs by incorporating the novel protein-like substance, i.e. CySH-P, into various proteins or protein-contining foodstuffs, but is not limited to foodstuffs. For instance, by utilizing the effect of decreasing the viscosity of gelatin, the CySH-P may also be used for improving the workability in the production of photographic films or photographic plates, wherein the viscosity of the emulsifier is decreased by the CySH-P.

The present invention is particularly useful for the following products in the foodstuff industry.

A: the products wherein the CySH-P is used for decreasing the viscosity thereof . . . low-viscosity creams, dairy products for babies, replacement for milk, soups (e.g. consomme soup), fat-protein emulsions, etc.

B: the products wherein the CySH-P is used for increasing the gel strength thereof . . . fish paste products (e.g. boiled fish paste, mashed yam-containing boiled fish paste, etc.), sausages (particularly skinless sausage), hams, puddings, jellies, bean jellies, soups (e.g. consomme soup), etc.

C: the products wherein the CySH-P is used for promoting the foamability thereof . . . topping creams, ice creams, foaming agents for foodstuffs, marshmallows, etc.

D: the products wherein the CySH-P is used for increasing the viscosity thereof . . . high-viscosity creams, sauces, etc.

The amount of the CySH-P to be added to the substrate protein is variable depending on the kinds of the proteins, the kinds of the properties to be modified, the working conditions in the processing of foodstuffs, and other factors, but may be at least 1% by weight, preferably 5% by weight or more, on the basis of the substrate protein. The modification of the substrate may be done by the chemical reaction between the substrate and the CySH-P, and therefore, is promoted by heating or agitation thereof. When the substrate is a heat-coagulative protein and the product should be gelled, over-heating should be avoided for preventing the undesirable gelation of the product. The heating or agitation may be carried out during the processing of foodstuffs or the like. The CySH-P may be merely added to the starting materials of the foodstuffs or to the processed foodstuffs. That is, the CySH-P may be added to the starting materials before they are processed, or in case of the processed foodstuffs such as a powerdered soup, CySH-P may be added to the processed product. During the processing, the CySH-P is reacted with the protein contained in the starting materials or in the processed foodstuffs and gives the desired properties thereto. The CySH-P and the substrate protein are contacted with each other in an aqueous medium, preferably, in the form of solution or dispersion.

The present invention is illustrated by the following Reference Example and Examples but is not limited thereto.

Reference Example

Preparation of CySH-P from Soybean Protein

A 2% aqueous solution of soybean protein (Fujipro-R, made by Fuji Oil Company, Ltd.) is adjusted to pH 10 with NaOH and is allowed to stand overnight and thereby is hydrated and modified. To the resultant is added Bioprase (made by Nagase Sangyo K.K.) in the ratio of 1% on the basis of soybean protein and the mixture is hydrolyzed by heating at 55° C. for 5 hours. The hydrolyzate is adjusted to pH 4.5 and the resulting precipitates are filtered off, and the supernatant liquid is concentrated. To the resultant is added ethyl cysteinate in the ratio of 10% by weight on the basis of the concentrated product (solid component), and the mixture is controlled to the concentration of the substrate: 50% (W/V) and the pH value: 5.5. To the mixture is added papain (made of Difco Co.) in the ratio of 1% by weight, and the mixture is incubated at 37° C. for 48 hours. After the incubation, the mixture is adjusted to pH 10, and the unreacted ethyl cysteinate is hydrolyzed and then the mixture is again adjusted to pH 7.0. To the reaction mixture is added ethanol in a concentration of 90% (W/V), and the resulting precipitates are collected to give the desired CySH-P.

EXAMPLE 1

Preparation of a Modified Soybean Protein

To a 5% aqueous solution of the soybean protein as used in Reference Example is added the CySH-P produced from soybean protein (half cystine content: 5% by weight or more). The mixture is adjusted to pH 7 and heated at 80° C. for 30 minutes and then lyophilized. The product thus obtained has excellent properties as a foaming agent.

EXAMPLE 2

Preparation of a Modified Egg White

To egg white is added 5% by weight of the CySH-P produced from soybean protein. The mixture is mixed well by agitating and then lyophilized. The lyophilized egg white thus obtained has superior foamability in comparison with the conventional dried egg white.

EXAMPLE 3

A mixture of milk casein (160 g), isolated soybean protein (40 g) and cheese whey powder (50 g) is added to a food cutter (made by Hanaki Seisakusho K.K.) and thereto are added a molten palm oil (melting point: 36° C., 200 g) and hot water (40° C., 600 g). After the mixture is completely mixed and dissolved, CySH-P (10 g) of Cheddar cheese flavor (0.1 g) are added thereto, and the mixture is mixed well with a food cutter. The mixture is filled into a synthetic resin-made casing and sterilized by immersing it in hot water of 90° C. for 30 minutes to give a cheese-like foodstuff.

For the purposes of comparison, a reference foodstuff is prepared in the same manner as described above excepting that no CySH-P is added.

These foodstuffs obtained above are each cut in a square size of 1 cm and added to a soup. The reference foodstuff is dispersed and dissolved in the soup during the cooking and loses its shape. On the other hand, the foodstuff of the present invention incorporated with CySH-P is not dispersed or dissolved and retains its shape (even if it is cracked, it is still in the form of a small particle) and has the cheese-like taste.

The foodstuffs are cut in a thickness of 3 mm and held between breads and then baked with a toaster for 2 minutes. The reference foodstuff is completely molten and penetrated into the bread, but on the other hand, the foodstuff of the present invention almost keeps its original shape.

What is claimed is:

1. A protein composition which is prepared by mixing a cysteine-enriched plastein containing about 5% by weight or more of half-cystine with a protein selected from the group consisting of plant seed protein, cow milk protein, animal meat protein, fish meat protein, egg protein and microorganism protein, in a ratio such that the amount of the cysteine-enriched plastein is at least 1% by weight based on the weight of the protein, dissolving or dispersing the resultant mixture in water, and heating the resultant solution or dispersion at a temperature of 40°–90° C.

2. The composition according to claim 1, wherein the protein is plant seed protein.

3. The composition according to claim 2, wherein the plant seed protein is soybean protein.

4. The composition according to claim 2, wherein the amount of the cysteine-enriched plastein is about 5% by weight or more based on the weight of the plant seed protein.

5. A protein composition which is prepared by mixing a cysteine-enriched plastein containing about 5% by weight or more of half-cystine with an egg protein to obtain a uniform mixture in which the amount of the cysteine-enriched plastein is at least 1% by weight based on the weight of the egg protein.

6. The composition according to claim 5, wherein the amount of the cysteine-enriched plastein is about 5% by weight or more based on the weight of the egg protein.

7. A method of promoting the gellation or foaming property of a protein selected from the group consisting of plant seed protein, cow milk protein, animal meat protein, fish meat protein, egg protein and microorganism protein, which comprises mixing a cysteine-enriched plastein containing about 5% by weight or more of half-cystine with the protein, in a ratio such that the amount of the cysteine-enriched plastein is at least 1% by weight based on the weight of the protein, dissolving or dispersing the resultant mixture in water, and heating the resultant solution or dispersion at a temperature of 40°–90° C.

* * * * *